United States Patent
Kim

(10) Patent No.: US 11,217,802 B2
(45) Date of Patent: Jan. 4, 2022

(54) METHOD AND SYSTEM FOR ESTIMATING AVAILABLE OUTPUT OF FUEL CELL

(71) Applicants: Hyundai Motor Company, Seoul (KR); Kia Motors Corporation, Seoul (KR)

(72) Inventor: Dae Jong Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/133,938

(22) Filed: Sep. 18, 2018

(65) Prior Publication Data
US 2019/0288312 A1    Sep. 19, 2019

(30) Foreign Application Priority Data
Mar. 14, 2018    (KR) .......................... 10-2018-0029636

(51) Int. Cl.
*H01M 8/04537*    (2016.01)
*H01M 8/04302*    (2016.01)
*H01M 8/04701*    (2016.01)
*H01M 8/0432*     (2016.01)

(52) U.S. Cl.
CPC ..... *H01M 8/04619* (2013.01); *H01M 8/0432* (2013.01); *H01M 8/04302* (2016.02); *H01M 8/04559* (2013.01); *H01M 8/04589* (2013.01); *H01M 8/04701* (2013.01)

(58) Field of Classification Search
None
See application file for complete search history.

(56) References Cited

U.S. PATENT DOCUMENTS 9,739,835 B2    8/2017    Kim

FOREIGN PATENT DOCUMENTS

| CN | 105895940 A | 8/2016 |
|---|---|---|
| DE | 102015220062 A1 | 8/2016 |
| KR | 10-1611123 B1 | 4/2016 |
| KR | 2017-0128681 A | 11/2017 |

*Primary Examiner* — Carmen V Lyles-Irving
(74) *Attorney, Agent, or Firm* — Mintz Levin Cohn Ferris Glovsky and Popeo, P.C.; Peter F. Corless

(57) ABSTRACT

A method of estimating available output of a fuel cell includes monitoring a current state of a fuel cell stack, determining a current performance of the fuel cell stack on the basis of the monitored current state, and estimating available output of the fuel cell stack under a specific voltage condition on the basis of the determined current performance of the fuel cell stack.

5 Claims, 5 Drawing Sheets

METHOD AND SYSTEM FOR ESTIMATING AVAILABLE OUTPUT OF FUEL CELL

CROSS REFERENCE TO RELATED APPLICATION(S)

The present application claims under 35 U.S.C. § 119(a) the benefit of Korean Patent Application No. 10-2018-0029636 filed on Mar. 14, 2018, the entire contents of which are incorporated by reference herein.

BACKGROUND

1. Technical Field

The present disclosure relates to a method and system for estimating available output of a fuel cell, and more particularly, to the method and system for estimating available output of a fuel cell stack to determine a low-temperature start of the fuel cell.

2. Description of the Related Art

A fuel cell, which is a kind of power generation device that converts chemical energy of fuel into electrical energy using an electrochemical reaction in a fuel cell stack, can be used to supply power for industrial use, home use, and driving a vehicle, and can also be used to supply power for small electric/electronic devices, particularly, mobile devices.

A fuel cell vehicle generates electrical energy using a reaction of hydrogen and oxygen in the fuel cell. The generated electrical energy is used as power for operating the fuel cell vehicle by driving a motor in the fuel cell vehicle, or the electrical energy may be used to generate power to be supplied to homes, offices, and/or factories through connection to an external power supply network.

Non-reacting hydrogen and condensate water produced from water coming from a cathode are discharged at an anode of the fuel cell. The non-reacting hydrogen is supplied to a fuel cell stack through a hydrogen recirculation device, and the condensate water is stored in a water trap and then discharged outside.

However, it is impossible to completely discharge the condensate water, so voltage generation performance may be poor in comparison to a room-temperature start due to cooling of the condensate water remaining in the fuel cell when an engine of a fuel cell vehicle that has been stored at a subzero temperature is started. This is because when the fuel cell is cooled, the condensate water remaining in the fuel cell is also cooled, so fuel gases are blocked by ice and cannot reach the reaction part.

Further, reaction of hydrogen and oxygen in the fuel cell is active in a specific temperature range, so high power generation efficiency can be achieved in the temperature range. Accordingly, work for increasing the temperature of a fuel cell system is performed when starting the fuel cell system under a specific temperature.

However, it is difficult to check the degree of increase in temperature of the fuel cell system and check an available output state of the fuel cell while increasing the temperature of the fuel cell system. Accordingly, starting is excessively delayed with respect to the available output state of the fuel cell until the fuel cell system is sufficiently increased in temperature.

The description provided above as a related art of the present disclosure is just for helping understanding the background of the present disclosure and should not be construed as being included in the related art known by those skilled in the art.

SUMMARY

In order to solve these problems, the present disclosure provides a technology of determining completion of a low-temperature start by estimating an available output of a fuel cell while starting a fuel cell system at a low temperature.

In accordance with an aspect of the present disclosure, there is provided a method of estimating available output of a fuel cell, the method including steps of: monitoring, by a monitor, a current state of a fuel cell stack; determining, by a performance determiner, a current performance of the fuel cell stack on the basis of the monitored current state; and estimating, by an available output estimator, an available output of the fuel cell stack under a specific voltage condition on the basis of the determined current performance of the fuel cell stack.

The method may further include, before the monitoring step: determining whether a low-temperature start condition of the fuel cell is satisfied; and performing temperature-increasing control on the fuel cell stack when the low-temperature start condition is satisfied.

Voltage or current of a fuel cell stack may be monitored in the monitoring step, and a present current-voltage performance of the fuel cell stack according to the monitored voltage or current of the fuel cell stack may be determined in the determining step.

In the step of estimating the available output, the available output of the fuel cell stack may be estimated by estimating current at the specific voltage condition on the basis of the determined present current-voltage performance.

Voltages of cells constituting the fuel cell stack may be monitored in the monitoring step, and the method may further include determining a final available output of the fuel cell by adding an available output correction amount determined on the basis of the monitored cell voltages to the estimated available output of the fuel cell, after the step of estimating the available output.

In the step of determining the final available output, a cell voltage ratio that is the ratio of a minimum voltage and an average voltage may be calculated on the basis of the monitored cell voltages and the available output correction amount may be determined on the basis of the cell voltage ratio.

The available output correction amount may be determined as a positive value when the cell voltage ratio is a predetermined first ratio or higher.

The available output correction amount may be determined as a negative value when the cell voltage ratio is a predetermined second ratio or lower.

The method may further include a step of determining whether to end temperature-increasing control of the fuel cell stack on the basis of the estimated available output, after the estimating of available output of the fuel cell stack.

In accordance with another aspect of the present disclosure, there is provided a system for estimating available output of a fuel cell, the system including: a monitor that monitors a current state of a fuel cell stack; a performance determiner that determines a current performance of the fuel cell stack on the basis of the current state monitored by the monitor; and an available output estimator that estimates available output of a fuel cell under a specific voltage condition in the fuel cell stack on the basis of the current performance of the fuel cell stack determined by the performance determiner.

The monitor may monitor voltage or current of a fuel cell stack and the performance determiner may determine a present current-voltage performance of the fuel cell stack according to the monitored voltage or current of the fuel cell stack.

The monitor may monitor voltages of cells constituting the fuel cell stack, and the system may further include a final available output determiner that determines final available output of the fuel cell by adding an available output correction amount determined on the basis of the cell voltages monitored by the monitor to the estimated available output of the fuel cell.

The system may further include a temperature-increasing controller that determines whether a low-temperature start condition of the fuel cells is satisfied, performs temperature-increasing control on the fuel cell stack when the low-temperature start condition is satisfied, and determines whether to end the temperature-increasing control of the fuel cell stack on the basis of the estimated available output.

In accordance with a further aspect of the present disclosure, a non-transitory computer readable medium containing program instructions executed by a processor, includes: program instructions that monitor a current state of a fuel cell stack; program instructions that determine a current performance of the fuel cell stack on the basis of the monitored current state; and program instructions that estimate an available output of the fuel cell stack under a specific voltage condition on the basis of the determined current performance of the fuel cell stack.

According to the method of estimating the available output of the fuel cell, when a cold start condition is satisfied, the temperature of the fuel cell stack can be quickly increased.

Further, whether to end temperature-increasing control of the fuel cell stack is determined by estimating the available output of the fuel cell according to the current performance of the fuel cell stack, so it is possible to reduce time taken to start the fuel cell system.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
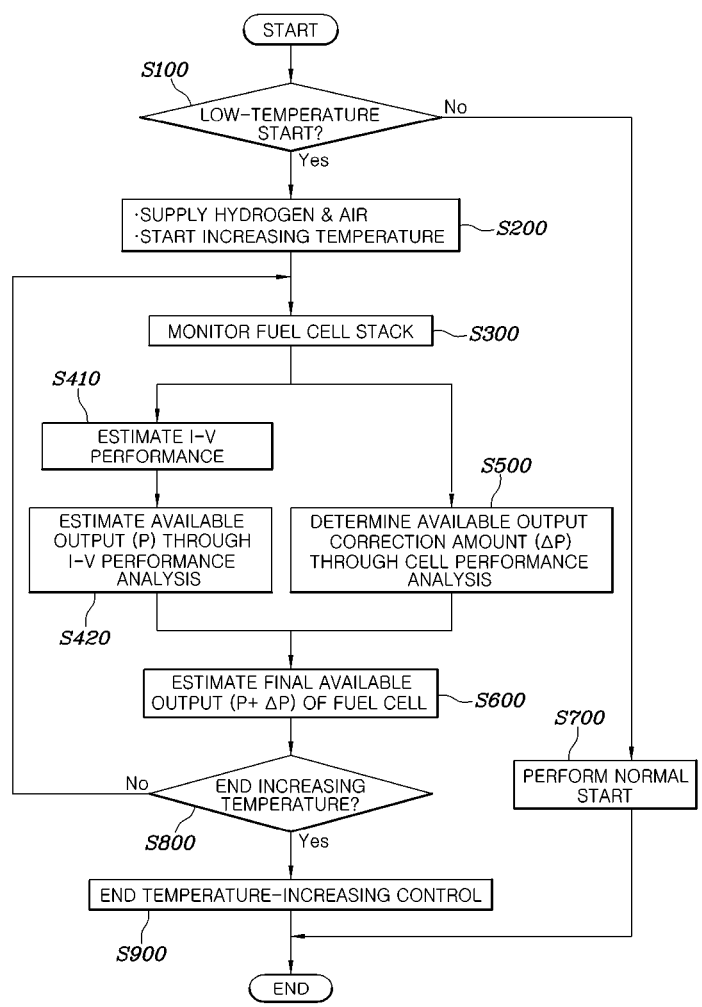
FIG. 1 is a flowchart showing a method of estimating available output of a fuel cell according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the following description, the structural or functional description specified to exemplary embodiments according to the concept of the present disclosure is intended to describe the exemplary embodiments, so it should be understood that the present disclosure may be variously embodied, without being limited to the exemplary embodiments.

The exemplary embodiments according to the concept of the present disclosure may be variously modified and may have various shapes, so examples of which are illustrated in the accompanying drawings and will be described in detail with reference to the accompanying drawings. However, it should be understood that the exemplary embodiments according to the concept of the present disclosure are not limited to the embodiments which will be described hereinbelow with reference to the accompanying drawings, but all modifications, equivalents, and substitutions are included in the scope and spirit of the disclosure.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

Exemplary embodiments will be described hereafter in detail with reference to the accompanying drawings. Like reference numerals given in the drawings indicate like components.

FIG. 1 is a flowchart showing a method of estimating available output of a fuel cell according to an embodiment.

Referring to FIG. 1, a method of estimating available output of the fuel cell according to an embodiment includes: monitoring a current state of a fuel cell stack (S300); determining a current performance of the fuel cell stack on the basis of the monitored current state (S410); and estimating an available output of the fuel cell stack under a specific voltage condition on the basis of the determined current performance of the fuel cell stack (S420).

The monitoring of the current state of the fuel cell stack (S300) can include monitoring the voltage, current, cell voltage etc. of the fuel cell stack and may monitor the temperature, pressure, humidity in the fuel cell stack. The voltage and current of the fuel cell stack may be voltage and current that are output from the fuel cell stack.

The monitoring of the current state of the fuel cell stack (S300) can include monitoring output or current currently required by the fuel cell stack. The output or current mean the output or current required from the fuel cell stack by parts such as a motor connected to a fuel cell system including the fuel cell stack. The output or current may be used to determine whether temperature-increasing control of the fuel cell has been finished, which will be described below.

The determining of current performance of the fuel cell stack (S410) can determine the current performance of the fuel cell stack on the basis of the current state of the fuel cell stack monitored in the monitoring (S300). Alternatively, it is possible to store a plurality of states in a specific memory and determine the performance for the stored state corresponding to the current state as the current performance by comparing the current state with the stored states.

The estimating of available output of the fuel cell stack (S420) can estimate the available output of the fuel cell stack under a specific voltage condition on the basis of the current performance of the fuel cell stack. The specific voltage condition may be a voltage condition in which the parts connected to the fuel cell stack can be normally driven. That is, output that can be possible under a condition in which the parts can be normally operated on the basis of the performance according to the monitored current state of the fuel cell stack.

According to the method of estimating available output of a fuel cell, it is possible to determined performance according to the current state of the fuel cell stack, and accordingly, it is possible to estimate the current available output of the fuel cell stack. Therefore, it is possible to efficiently manage power distribution of a fuel cell system.

The method may further include: before the monitoring (S300), determining whether a low-temperature start condition of the fuel cell is satisfied (S100); and performing temperature-increasing control on the fuel cell stack when the low-temperature start condition is satisfied (S200).

The determining of whether the low-temperature start condition of the fuel cell is satisfied (S100) can include determining whether it is a low-temperature start condition of the fuel cell by measuring the internal temperature of the fuel cell stack, whether condensate water has been frozen in the fuel cell stack, the off-time of the fuel cell system, and the external temperature. It may be most accurate to measure the internal temperature of the fuel cell, but it may be possible to indirectly determine the low-temperature start condition of the fuel cell, using the external temperature and the off-time of the fuel cell system.

The performing of temperature-increasing control on the fuel cell stack (S200) can including controlling the temperature of the fuel cell stack to increase when the low-temperature start condition of the fuel cell system is satisfied. It is possible to perform temperature-increasing control while starting to generate power through the fuel cell by supplying hydrogen and air to the fuel cell stack.

There are various methods of performing temperature-increasing control for increasing the temperature of the fuel cell stack, that is, it may be possible to control current or voltage of the fuel cell stack such that heat generation amount is increased such as static voltage control that maintains the voltage of the fuel cell stack at a predetermined level or static current control that maintains the current of the fuel cell stack at a predetermined level, or it may be possible to increase the temperature of the fuel cell stack, using a specific element for heating the fuel cell stack.

When the low-temperature start condition is not satisfied in the determining of whether the low-temperature start condition of the fuel cell is satisfied (S100), the fuel cell can be normally started (S700). That is, instead of cold start control, a normal start can be performed.

The method of estimating available output of the fuel cell may further include determining whether to end temperature-increasing control of the fuel cell stack on the basis of the estimated available output (S800), after the estimating of available output of the fuel cell stack (S420).

That is, whether to end temperature-increasing control of the fuel cell stack is determined, using the estimated current available output of the fuel cell stack. In particular, it is possible to end the temperature-increasing control by determining whether the current available output is predetermined output or higher.

Alternatively, it is possible to end the temperature-increasing control (S900) by determining whether the current available output is required output or more, using the output of current required for the fuel cell stack to drive parts such as the motor connected to the fuel cell system monitored in the monitoring step (S300).

Figure 2:
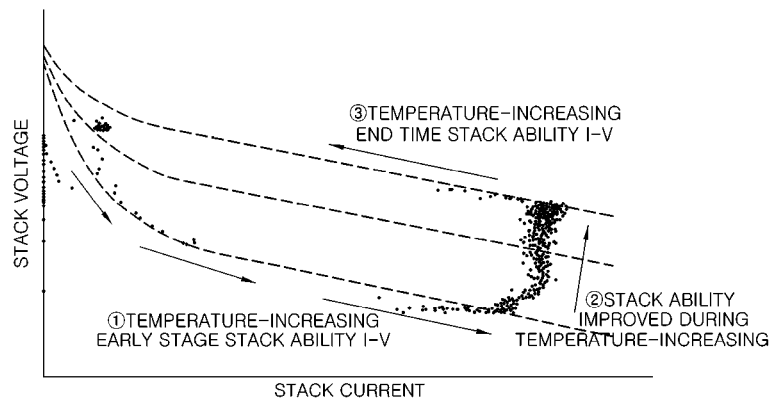
FIG. 2 is a graph showing a change of a current-voltage performance curve while a fuel cell system is increased in temperature.

FIG. 2 is a graph showing a change of a current-voltage performance curve while a fuel cell system is increased in temperature.

Referring to FIG. 2, when the fuel cell system that has been left at a low temperature for a long time is started, relatively low voltage is achieved from the same current, as shown by a ① temperature-increasing early stage stack performance I-V curve, in the early stage of temperature-increasing control of a fuel cell stack, so the performance of the fuel cell stack is low. However, ② as the temperature of the fuel cell stack is increased, the performance of the fuel cell stack is improved, and when the temperature of the fuel cell stack is increased, as shown by a ③ temperature-increasing end time stack performance I-V curve, the performance is improved and an improve performance curve is shown.

In the state of the ① temperature-increasing early stage stack performance I-V curve, output required for the fuel cell system cannot be supplied at the current in the temperature-increasing control process or the current condition required for the fuel cell system. Voltage that is equal to or lower than a voltage condition that can normally drive high-voltage parts connected to the fuel cell system cannot be obtained from a corresponding current condition, so the high-voltage parts may be damaged due to low voltage.

Figure 3:
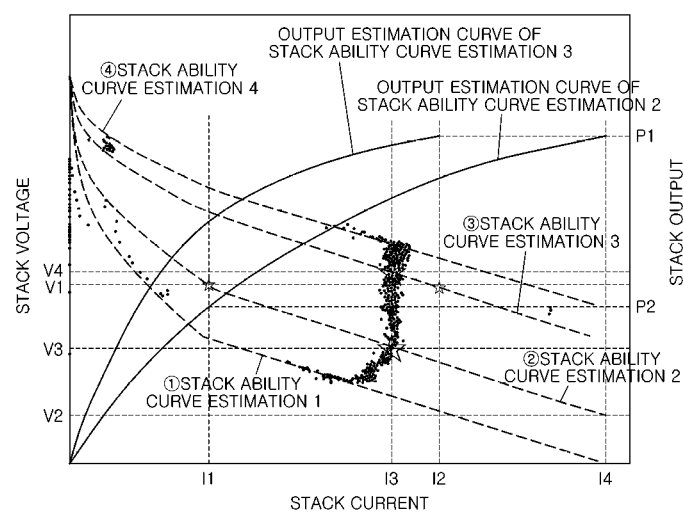
FIG. 3 is a graph showing the current-voltage performance curve of the fuel cell and an available output estimation curve of the fuel cell according to an embodiment.

FIG. 3 is a graph showing a current-voltage performance curve of the fuel cell and an available output estimation curve of the fuel cell according to an embodiment.

Referring to FIG. 3, the monitoring (S300) of the present disclosure can monitor the voltage or current of the fuel cell stack and the determining (S410) can estimate a present (i.e., a presently occurring or current) current-voltage performance of the fuel cell stack according to the monitored voltage or current of the fuel cell stack.

As provided herein, when static current control that maintains the current of the fuel cell stack at a predetermined level I3 is performed as a method of temperature-increasing control of the fuel cell stack before the monitoring (S300), it is possible to monitor only the voltage of the fuel cell stack in the monitoring (S300). On the other hand, when static voltage control that maintains the voltage of a fuel cell stack at a predetermined level is performed, it is possible to monitor only the current of the fuel cell stack. Accordingly, it is possible to estimate a fuel cell stack current-voltage performance curve.

Alternatively, it may be possible to estimate the fuel cell current-voltage performance curve by monitoring both the voltage and current of the fuel cell stack in the monitoring (S300). In this case, it is possible to estimate the fuel cell current-voltage performance curve on the basis of points corresponding to a plurality of voltages and currents.

As a method of estimating the fuel cell current-voltage performance curve, it may be possible to simply measure a plurality of voltages and currents output from a fuel cell stack, thereby estimating the current-voltage performance curve. However, this method has a drawback in that a large amount of data is required, so estimation takes long time.

Further, as shown in FIG. 3, it can be seen that the slope of voltage according to an increase or a decrease of current is almost the same in the area where current is a predetermined level I1 or higher, among a plurality of fuel cell current-voltage performance curves. Even if the current-voltage performance is improved by increasing the temperature of the fuel cell stack, it is possible to estimate a current-voltage performance curve by assuming that the slope of the current-voltage performance curve is constant.

Alternatively, it may be possible to store a plurality of current-voltage performance curves in a specific memory and select and estimate a current-voltage performance curve corresponding to the voltage and current output from the fuel cell stack.

In the estimating of available output (S420), it is possible to estimate available output P of the fuel cell stack by estimating current under a specific voltage condition on the basis of the determined present current-voltage performance.

That is, it is possible to estimate the present current-voltage performance curve, estimate current at a specific voltage of the current-voltage performance curve, and then estimate available output P of the fuel cell stack using an equation output [W]=current [A]×voltage [V].

For example, when static current control is performed to increase the temperature of the fuel cell stack, voltage can be increased at current I3. When the monitored voltage of the fuel cell stack is V3 in the monitoring (S300), the present current-voltage performance curve can be determined as the state of ② stack performance curve estimation 2.

Assuming that the specific voltage is V1 in this state, it may be estimated to be able to output current I1 at the specific voltage V1 on the basis of the ② stack performance curve estimation 2. Accordingly, the available output P of the fuel cell stack can be estimated as P2 from I1×V1=P2.

V1 that is specific voltage may be reference voltage considering a safety coefficient allowing all high-voltage parts to stably operate.

When voltage V4 is output and monitored under a current condition I3 in the monitoring by further increasing the temperature of the fuel cell stack, the present current-voltage performance curve can be determined as the state of ③ stack performance curve estimation 3.

Assuming that the specific voltage is V1 in this state, it may be estimated to be able to output current I3 at the specific voltage V1 on the basis of the ③ stack performance curve estimation 3. Accordingly, the available output P of the fuel cell stack can be estimated as P1 from I3×V1=P1.

Accordingly, by determining the current performance of the fuel cell stack and estimating the available output under specific voltage condition that can normally drive parts connected to the fuel cell stack, it is possible to estimate accurate available output that the fuel cell stack can actually use.

Figure 4:
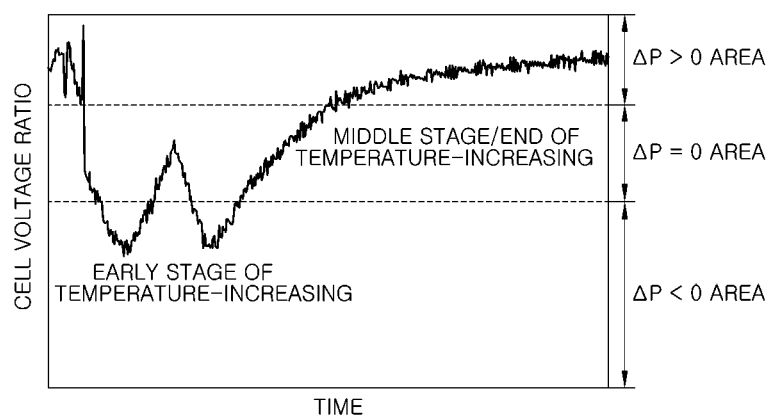
FIG. 4 is a graph showing a change of a cell voltage ratio of the fuel cell to time according to an embodiment.

FIG. 4 is a graph showing a change of a cell voltage ratio of the fuel cell to time according to an embodiment.

Referring to FIG. 4, condensate water in the fuel cell has been frozen in the early stage of temperature-increasing stage of the fuel cell stack, and in the early stage of temperature-increasing control of the frozen condensate water, cells having relatively low performance and cells having relatively high performance both exist due to a non-uniform frozen state.

As temperature-increasing control is performed, high-temperature heat is generated by the cells having relatively low performance, so the cells having relatively low performance gradually recover to have normal cell performance. Accordingly, the cell voltage ratio converges on a value close to 1 at the end of the temperature-increasing control.

The cell voltage ratio, which is a ratio of the minimum cell voltage and the average cell voltage, may be obtained by dividing the minimum cell voltage of monitored cell voltages by the average cell voltage that is the average of the monitored cell voltages.

Accordingly, the monitoring (S300) monitors the voltages of the cells constituting the fuel cell stack, and the method of estimating available output of a fuel cell may further include determining the final available output P+ΔP of the fuel cell by adding an available output correction amount ΔP determined on the basis of the monitored cell voltages to the estimated available output P of the fuel cell (S600), after the estimating of available output (S420).

In particular, in the determining of final available output (S600), it is possible to calculate a cell voltage ratio that is the ratio of the minimum voltage and the average voltage on the basis of the monitored cell voltages and to determine the available output correction amount ΔP on the basis of the cell voltage ratio.

In particular, in determining of an available output correction amount ΔP (S500), the available output correction amount ΔP can be determined as a positive value when the cell voltage ratio is a predetermined first ratio or higher and can be determined as a negative value when the cell voltage ratio is a predetermined second ratio or lower.

That is, the cell voltages are uniform in the area where the cell voltage ratio is the predetermined first ratio or higher, regardless of the available output P estimated in the estimating of available output (S420), so the available output correction amount ΔP can be determined as a positive value. That is, it is possible to determine final available output P+ΔP larger than the estimated available output by adding a positive value to the estimated available output P when determining the final available output P+EP.

On the other hand, the cell voltages are not uniform in the area where the cell voltage ratio is the predetermined second ratio or lower, so the available output correction amount ΔP can be determined as a negative value. That is, it is possible to determine final available output (P+ΔP) smaller than the estimated available output by adding a negative value to the estimated available output P when determining the final available output P+EP.

The available output correction amount (ΔP) can be changed in accordance with the cell voltage ratios in the area where the cell voltage ratio is the predetermined first ratio or higher and the area where the cell voltage ratio is the predetermined second ratio or lower. In particular, it is possible determine a larger available output correction amount (ΔP) as the cell voltage ratio at the area where the cell voltage ratio is the predetermined first ratio or higher increases, and determine a smaller available output correction amount (ΔP) as the cell voltage ratio at the area where the cell voltage ratio is the predetermined second ratio or lower decreases. Alternatively, it may be possible to determine available output correction amount (ΔP) as predetermined fixed values at the area where the cell voltage ratio is the predetermined first ratio or higher and at the area where the cell voltage ratio is the predetermined second ratio or lower. Further, the available output correction amount (ΔP) may be determined as 0 at the areas where the cell voltage ratio is larger than the predetermined second ratio and smaller than the predetermined first ratio.

Accordingly, by determining the final available output in consideration of whether the voltages of the cells constituting the fuel cell stack is uniform on the basis of cell voltage ratios, the degree of uniformity of cell voltages is determined to determine whether to end the temperature-increasing control of the fuel cell stack. Therefore, it is possible to more accurately and appropriately determine the time to end the temperature-increasing control of the fuel cell stack.

Figure 5:
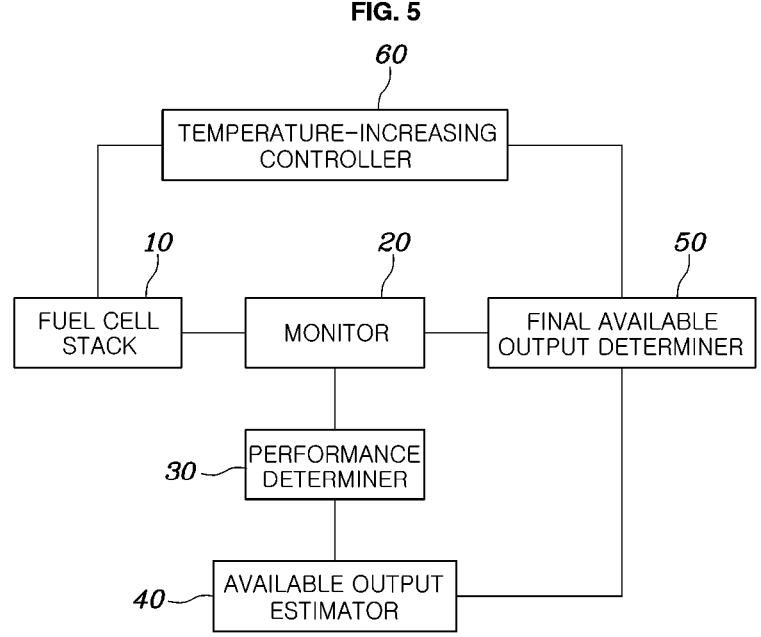
FIG. 5 is a diagram showing the configuration of a system for estimating available output of a fuel cell according to an embodiment.

FIG. 5 is a diagram showing the configuration of a system for estimating available output of a fuel cell according to an embodiment.

Referring to FIG. 5, a system for estimating available output of the fuel cell according to an embodiment includes: a monitor 20 that monitors the current state of a fuel cell stack 10; a performance determiner 30 that determines the current performance of the fuel cell stack 10 on the basis of the current state monitored by the monitor 20; and an available output estimator 40 that estimates available output of a fuel cell under a specific voltage condition in the fuel cell stack 10 on the basis of the current performance of the fuel cell stack 10 determined by the performance determiner 30.

The monitor 20 can monitor voltage or current of the fuel cell stack 10 and the performance determiner 30 can determine the present current-voltage performance of the fuel cell stack 10 according to the voltage or current of the fuel cell stack 10 monitored by the monitor 20.

The monitor 20 can monitor the voltages of cells constituting the fuel cell stack 10 and the system may further include a final available output determiner 50 that determines the final available output of the fuel cell by adding an available output correction amount, which is determined on the basis of the voltages of the cells monitored by the monitor 20, to the estimated available output of the fuel cell.

The system may further include a temperature-increasing controller 60 that determines whether a low-temperature start condition of the fuel cells is satisfied, performs temperature-increasing control on the fuel cell stack 10 when the low-temperature start condition is satisfied, and determines whether to end the temperature-increasing control of the fuel cell stack 10 on the basis of the estimated available output.

The monitor 20, performance determiner 30, available output estimator 40, final available output determiner 50, and temperature-increasing controller 60 connected to the fuel cell stack 10, which are kinds of controllers, may be integrated in a single unit and included in a Fuelcell Control Unit (FCU) or may be separate controllers.

Figure 6:
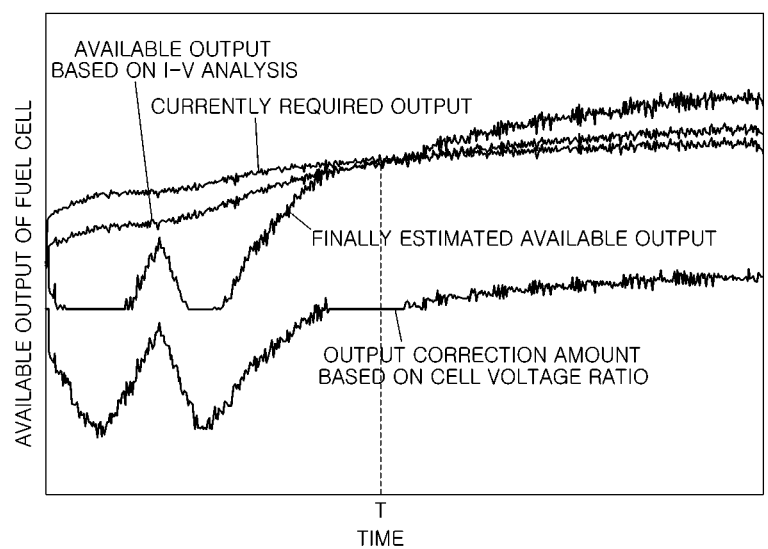
FIG. 6 is a graph showing available output of a fuel cell according to a method and system for estimating available output of the fuel cell.

FIG. 6 is a graph showing available output of a fuel cell according to a method and system for estimating available output of the fuel cell.

Referring to FIG. 6, a graph obtained by estimating available output according to I-V performance analysis of the present disclosure and a graph showing an output correction amount according to cell voltage ratios are shown, and final available output of the fuel cell determined by summing the available output and the output correction amount is also shown.

Further, a graph of the current output required for power generation of a fuel cell stack is shown. Accordingly, it is possible to end temperature-increasing control of the fuel cell stack at the point of time T where the graph showing the final available output of the fuel cell and the graph showing the currently required output meet each other. That is, it is possible to determine the point of time T where the final available output of the fuel cell is the currently required output or higher as the point of time to end the temperature-increasing control of the fuel cell stack.

Therefore, it is possible to determine the point of time to end temperature-increasing start of the fuel cell stack and solve the problem in that the temperature-increasing start process of the fuel cell stack is unnecessarily delayed.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A method of estimating available output of a fuel cell to manage power distribution of a fuel cell system by increasing temperature of the fuel cell when a cold start condition is satisfied, the method comprising the steps of:

determining whether the cold start condition of the fuel cell is satisfied;

in response to determining that the cold start condition of the fuel cell is satisfied, performing the temperature-increasing control on the fuel cell stack;

monitoring, by a monitor, voltage or current of a fuel cell stack;

determining, by a performance determiner, a present current-voltage performance of the fuel cell stack on the basis of the monitored voltage or current of the fuel cell stack;

estimating, by an available output estimator, an available output of the fuel cell stack by estimating current under a specific voltage condition on the basis of the determined present current-voltage performance, determining whether the current available output is predetermined output or higher; and in response to determining that the current available output is predetermined output or higher, terminating the temperature-increasing control on the fuel cell stack.

2. The method of claim 1, wherein voltages of cells constituting the fuel cell stack are monitored in the monitoring step, and the method further comprises determining a final available output of the fuel cell by adding an available output correction amount determined on the basis of monitored cell voltages to the estimated available output of the fuel cell, after the step estimating of the available output.

3. The method of claim 2, wherein in the step of determining the final available output, a cell voltage ratio that is the ratio of a minimum voltage and an average voltage is calculated on the basis of the monitored cell voltages and the available output correction amount is determined on the basis of the cell voltage ratio.

4. The method of claim 3, wherein the available output correction amount is determined as a positive value when the cell voltage ratio is a predetermined first ratio or higher.

5. The method of claim 3, wherein the available output correction amount is determined as a negative value when the cell voltage ratio is a predetermined second ratio or lower.

* * * * *